UNITED STATES PATENT OFFICE.

ADOLPH BAEYER, OF MUNICH, BAVARIA, GERMANY, ASSIGNOR TO BAD-
ISCHE ANILIN AND SODA FABRIK, OF MANNHEIM, BADEN, GERMANY.

MANUFACTURE OF ARTIFICIAL INDIGO.

SPECIFICATION forming part of Letters Patent No. 240,941, dated May 3, 1881.

Application filed March 9, 1881. (Specimens.)

To all whom it may concern:

Be it known that I, ADOLPH BAEYER, a subject of the King of Bavaria, residing at Munich, in the Kingdom of Bavaria and Empire of Germany, have invented new and useful Improvements in the Manufacture of Dye-Stuffs or Coloring-Matters, of which the following is a specification.

This invention consists in the production of blue coloring-matter from isatine by converting the said isatine into isatine-chloride and then submitting the said isatine-chloride to the action of suitable reducing or deoxidizing substances.

In order to convert isatine into isatine-chloride, I may employ pentachloride of phosphorus, and the conversion of the said isatine-chloride into coloring-matters may be effected with the aid of glacial acetic acid and suitable reducing or deoxidizing agents, such as phosphorus, zinc-dust, hydriodic acid, or sulphide of ammonium.

In carrying out this invention I take a mixture of about five parts, by weight, of isatine, with about six parts, by weight, of pentachloride of phosphorus and about eight parts, by weight, of dry benzole, and the said mixture is heated to about 80° centigrade, until no more hydrochloric-acid gas is set free. The solution thus obtained deposits, upon cooling, the isatine-chloride. In order to convert the isatine-chloride thus produced into coloring-matters, I take about one hundred parts, by weight, of glacial acetic acid and add thereto, while stirring, about twenty parts, by weight, of zinc-dust, and then add, in small portions, about five parts, by weight, of isatine-chloride. The mixture is kept agitated until it is decolorized. The filtered solution is afterward exposed to the access of air, whereby the liquid gradually turns blue. It is then thrown into cold water, and the coloring-matter is precipitated thereby, and may be collected on a filter.

The coloring-matter thus obtained is partly soluble in alcohol with a purple color. It may be used in a manner similar to that in which vegetable indigo is now used and for the same purposes.

What I claim as new, and desire to secure by Letters Patent, is—

1. As a new article of manufacture, the blue dye-stuff or coloring-matter produced from isatine-chloride, having the qualities herein specified.

2. The within-described process for producing a blue dye-stuff or coloring-matter by exposing isatine-chloride to the action of glacial acetic acid and zinc-dust, or other reducing agents, substantially in the manner set forth.

In testimony whereof I have hereunto set my hand in the presence of two subscribing witnesses.

ADOLPH BAEYER.

Witnesses:
 OSCAR R. JACKSON,
 CARL A. OETTINGER.